US006999378B2

(12) United States Patent
Beaucoup

(10) Patent No.: US 6,999,378 B2
(45) Date of Patent: Feb. 14, 2006

(54) PARALLEL GCS STRUCTURE FOR ADAPTIVE BEAMFORMING UNDER EQUALIZATION CONSTRAINTS

(75) Inventor: Franck Beaucoup, Dunrobin (CA)

(73) Assignee: Mitel Networks Corporation, Ottawa (CA)

( * ) Notice: Subject to any disclaimer, the term of this patent is extended or adjusted under 35 U.S.C. 154(b) by 0 days.

(21) Appl. No.: 11/125,498

(22) Filed: May 10, 2005

(65) Prior Publication Data

US 2005/0254347 A1 Nov. 17, 2005

(30) Foreign Application Priority Data

May 14, 2004 (GB) ..................................... 410847

(51) Int. Cl.
*G01S 3/80* (2006.01)
*G01S 15/00* (2006.01)

(52) U.S. Cl. ....................................... 367/119; 367/103

(58) Field of Classification Search ................ 367/103, 367/119, 121; 342/154
See application file for complete search history.

(56) References Cited

U.S. PATENT DOCUMENTS 5,532,700 A * 7/1996 Lockwood .................. 367/103
6,914,854 B1 * 7/2005 Heberley et al. ........... 367/119
2002/0041695 A1 * 4/2002 Luo ............................ 381/92

* cited by examiner

*Primary Examiner*—Ian J. Lobo
(74) *Attorney, Agent, or Firm*—William J. Sapone; Coleman Sudol Sapone P.C.

(57) ABSTRACT

A parallel GSC structure is provided by which an adaptive process is performed by a plurality of beamformers in parallel in such a way that they present a common response to the equalization signal that varies over time in an optimal manner with respect to the statistics of the steering vectors.

7 Claims, 1 Drawing Sheet

PARALLEL GCS STRUCTURE FOR ADAPTIVE BEAMFORMING UNDER EQUALIZATION CONSTRAINTS

FIELD OF THE INVENTION

The present invention is directed to adaptive beamforming, and more particularly to a parallel Generalized Side-lobe Canceller (GSC) structure in which the adaptive process is performed via a plurality of beamformers in parallel.

BRIEF DESCRIPTION OF THE DRAWINGS

A description of the prior art and of the present invention is set forth below, with reference to the following drawings in which.

BACKGROUND OF THE INVENTION

Figure 1:
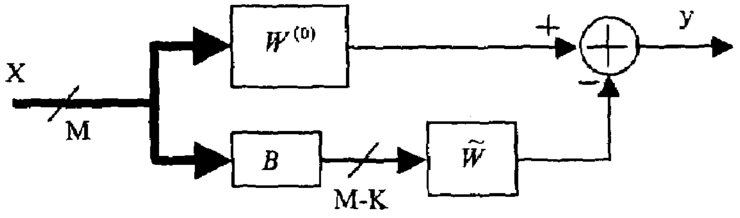
Figure 1 (Prior Art)
FIG. 1 is a block diagram of a conventional GSC structure.

Adaptive beamforming has been used for several decades in a wide variety of applications such as radar, sonar, and more recently smart antennas for telecommunications and audio conferencing. In some applications, it is desirable to provide a plurality of adaptive beamformers having different look directions but the same response under equalization constraints.

One application where such design constraints arise is loudspeaker coupling equalization for audio conference systems, such as described in [1] F. Beaucoup and M. Tetelbaum, "A method for optimal microphone array design under uniform acoustic coupling constraints", UK Patent Application No. 0321722.1, filed Sep. 16, 2003, and [2] F. Beaucoup, "Parallel beamformer design under response equalization constraints", Proceedings of IEEE International Conference on Acoustics, Speech and Signal Processing (ICASSP) 2004, Montreal, Canada. In these references, optimal solutions have been proposed for the design of fixed (as opposed to adaptive) beamformers under such constraints. These solutions can be extended to the adaptive framework via a family of adaptive beamforming methods known as "block-adaptive" methods. However, another family of adaptive beamforming methods, known as "sample-by-sample" methods, are more appropriate for some applications, typically those where the operating environment is non-stationary. For these methods, the optimal fixed-beamforming solution set forth in [1] and [2] cannot be used.

As mentioned above, general adaptive beamforming can be performed either with block-adaptive methods or with sample-by-sample methods. Both families of methods and their characteristics are discussed in [3] D. G. Manolakis, V. K. Ingle and S. M. Kogon, "Statistical and adaptive signal processing", McGraw-Hill, 2000.

Block-adaptive methods use a block of data received at the sensor array over a period of time to estimate the second-order statistics of the desired signal and/or the interference signal at the array. These statistics are collected in an interference-plus-noise correlation matrix and optimal, fixed beamforming design techniques such as Minimum-Variance-Distortionless-Response (MVDR) or Linearly-Constrained-Minimum-Variance (LCMV) are used to design the beamforming weights. This process is carried out over time to ensure adaptive behavior of the array processing.

With sample-by-sample methods, the beamforming weights are updated for each new sample of data coming to the array using adaptive filtering techniques. The convergence to the optimal beamforming weights is gradual, on a sample-by-sample basis; which ensure a constant, gradual adaptation to non-stationary environments. It should be noted that the process at each sample requires considerably less computation than the block-adaptive, "sample-matrix-inversion" process. Also, the steering vector (that is, the statistics of the desired signal) is deterministic and known a-priori as opposed to estimated from real-time data.

The inventor is unaware of any reference in the literature to the exact problem of adaptive beamforming under response equalization constraints. The only explicit references to the problem of beamforming design under response equalization constraints are set forth in [1] and [2] referred to above, and are restricted in their scope to the fixed beamforming framework. However, known techniques can be applied in a straightforward manner to solve this problem in the adaptive framework, both with block-adaptive methods and with sample-by-sample methods (although in a less-than-optimal manner in the latter case, as discussed below).

For a block-adaptive implementation, the "parallel design" method presented in [1] and [2] can be used directly as a "parallel sample-matrix inversion" implementation. With this approach, all beamformers are designed at the same time in an optimal manner given the equalization constraint. The parallel correlation matrix is calculated based on data statistics collected over a period of time just as it is in the traditional sample-matrix inversion implementation. However, as mentioned above, block-adaptive methods can be less appropriate than sample-by-sample methods for some applications, particularly for those where the operating environment is non-stationary.

To present a sample-by-sample implementation of a solution to the problem, it is necessary to understand the principle of sample-by-sample adaptive beamforming techniques.

Sample-by-sample adaptive beamforming methods rely on an algorithmic structure that transforms the initial constrained optimization problem (MVDR or LCMV) into an unconstrained optimization problem that is then solved as a least-square problem with an iterative optimization algorithm such as the least-mean-square (LMS) algorithm. The conventional structure for this transformation is known as the Generalized Side-lobe Canceller (GSC). The development of the GSC structure was motivated by the adaptive implementation set forth in [4] O. L. Frost, "An algorithm for linearly constrained adaptive array processing", Proc. IEEE, Vol. 60, pp. 926–935, August 1972, and first formulated in [5] S. P. Applebaum and D. J. Chapman, "Adaptive arrays with main beam constraints", IEEE Trans. on Antennas and Propagation, Vol. 24, pp. 650–662, September 1976 and [6] L. J. Griffiths and C. W. Jim, "An alternative approach to linearly constrained adaptive beamforming", IEEE Trans. on Antennas and Propagation, Vol. 30, pp. 27–34, January 1982, where the GSC terminology was first coined. It has since then been used extensively in a wide variety of applications. References [3] and [7] B. D. Van Veen and K. M. Buckley, "Beamforming: a versatile approach to spatial filtering", IEEE Acoustic, Speech and Signal Processing magazine, pp. 4–24, April 1988, provide more detailed presentations of the GSC structure. This structure can be used as a prior-art technique to solve the problem of multiple beamformer design under response equalization constraints as explained below.

With the same notations as in [1], the GSC structure can be formalized as follows for the general case of LCMV beamforming. If $W=W(v)$ represents the frequency-domain complex weight array (column vector of length M equal to the number of sensors in the array), then the general LCMV optimization problem can be written as follows:

$$\underset{W}{\mathrm{Min}}(W^H \cdot R \cdot W)$$

subject to $C^H.W=G$.

In this formulation, $R=R(v)$ is the noise correlation matrix (size M×M), $C=C(v)$ is the constraint matrix (size M by K where K is the number of constraints) and $G=G(v)$ is the constraint gain vector (size K). The explicit solution is then given by the following formula:

$$W=R^{-1}.C[C^H.R^{-1}.C]^{-1}G.$$

The GSC structure is based on the realization that if a given beamformer $W^{(0)}$ satisfies the set of linear constraint imposed on the optimization problem; that is, $C^H.W^{(0)}=G$, then the difference between this beamformer $W^{(0)}$ and the solution to the constrained optimization problem lies in the null space of the constraint matrix C. In other words, the solution to the constrained optimization problem can be expressed as $W=W^{(0)}-V$ with $V \in \mathrm{null}(C)$; that is, $C.V=0$. The constrained optimization problem is therefore equivalent to the following unconstrained optimization problem:

$$\underset{V}{\mathrm{Min}}\left((W^{(0)}-V)^H \cdot R \cdot (W^{(0)}-V)\right).$$

The GSC is a practical structure that allows the resolution of the unconstrained optimization problem by sample-by-sample unconstrained optimization algorithms. For this, the vector V is expressed as a linear combination of the columns of a M×(M−K) matrix B; that is, $V=B.\tilde{W}$, with $\tilde{W}$ being a column vector of length (M−K). This is possible provided the columns of B form a basis for the null space of C. This formulation leads to the GSC structure shown in FIG. 1. Note that if the steering vector X is one of the linear constraints in C, or if it belongs to the linear space spanned by the constraints, then it is blocked by B, meaning that $X^H B=0$ (i.e. the "blocking matrix" for the matrix B).

Practically, the upper branch of the GSC structure is a fixed beamformer that satisfies the constraints of the LCMV constrained optimization problem. The blocking matrix B is obtained from the constraint matrix C using any of several orthogonalization techniques such as Gram-Schmidt, QR decomposition or singular value decomposition (see [8] G. H. Golub and C. F. Van Loan, "Matrix computations", The John Hopkins University Press, Baltimore, Md., 1989). The adaptive beamforming weights $\tilde{W}$ are calculated adaptively with a sample-by-sample adaptive filtering algorithm such as LMS driven by the error y (see FIG. 1) so as to match the response of the lower branch to that of the upper branch and therefore minimize the response of the total, combined beamformer.

For the particular problem of multiple beamformer design under response equalization constraints, the conventional GSC structure can be used in the following manner, which will be understood by a person of ordinary skill in the art. First, one a set of fixed beamformers is designed $W_1^{(0)}, \ldots, W_N^{(0)}$ that satisfy the response equalization constraints as well as the distortionless constraints in their respective look directions. For example, this can be accomplished with the parallel beamformer design methods presented in [1] and [2]. Then, for each individual beamformer, perform adaptive beamforming with the GSC structure with two linear constraints (K=2): one for the look direction (with the response set to 1) and one for the equalization signal (with the response set to 0). This way, the lower branch of each individual GSC structure is guaranteed to block the equalization signal, and therefore each individual resulting beamformer is guaranteed to present the same response as its upper branch to the equalization signal. Since the fixed beamformers $W_1^{(0)}, \ldots, W_N^{(0)}$ satisfy the response equalization constraints, so do the combined resulting beamformers.

The drawback of this approach is that the common response of the beamformers to the equalization signal is constrained to stay constant, equal to the common response of the original fixed beamformers $W_1^{(0)}, \ldots, W_N^{(0)}$ throughout the adaptive process. As explained in [2], the optimal value for this common response value depends on the statistics of the steering vectors and a hard constraint to an arbitrary value can have severe effects on the directivity of the resulting beamformers. In non-stationary environments, the statistics vary with time and are not known in advance. Therefore constraining the response value to stay constant, equal to an arbitrary value, does not appear to be optimal in the context of the original response equalization constraints (these constraints only specify that all beamformers must have the same response to the equalization signal; not the actual response value).

SUMMARY OF THE INVENTION

The present invention offers a new adaptive beamforming structure that solves the problem of optimal sample-by-sample adaptive beamforming under response equalization constraints. This structure is based on similar principles as the fixed-beamforming method presented in [1] and [2] and can be shown to be superior to the existing method set forth above in terms of the performance of the resulting beamformers.

According to the present invention, an algorithmic structure, referred to herein as the parallel GSC structure, is provided whereby the adaptive process is performed for all beamformers in parallel in such a way that they present a common response to the equalization signal that varies over time in an optimal manner with respect to the statistics of the steering vectors.

DETAILED DESCRIPTION OF THE PREFERRED EMBODIMENTS

The theoretical framework behind the present invention is the same as in [1] and [2] wherein the optimization problem is moved to a hyperspace of dimension M×N (where N is the number of beamformers to be designed and M is the number of sensors in the array). In that hyperspace, the LCMV formulation of the problem of multiple beamformer design under response equalization constraints can be written as in [1] and [2]:

$$\operatorname*{Min}_{W}(W^{H}.R.W)$$

subjected to $C^H.W=G$.

In this formulation, W=W(v) is the concatenated array of size N.M of all beamformer weights and R=R(v) is the block-diagonal concatenated noise correlation matrix. With respect to the constraints, C=C(v) is the concatenated constraint matrix of size N.M×K where K is the number of constraints, (e.g. K=2N−1 for the response equalization problem) and G=G(v) is the concatenated constraint gain vector of size K.

First, it will be understood that the transformation of this constrained optimization problem into an unconstrained problem can be carried out in the same way as for the "single beamformer" case set forth above. A "parallel blocking matrix" B of size N.M×(N.M−K) can be introduced and the unconstrained parallel optimization problem can be written as $$\operatorname*{Min}_{\tilde{W}}\left(\left(W^{(0)}-B.\tilde{W}\right)^{H}.R.\left(W^{(0)}-B.\tilde{W}\right)\right),\quad \text{where } W^{(0)}=\begin{bmatrix} W_1^{(0)} \\ \cdots \\ W_N^{(0)} \end{bmatrix}$$

is the concatenated fixed-beamformer array of size N.M and $\tilde{W}$ is the parallel unconstrained beamformer-weights array of size (N.M−K).

Next, it will be understood that this "parallel beamformer" unconstrained optimization problem cannot be mapped onto a GSC structure in a straightforward, conventional manner, because the concatenated noise correlation matrix R is not the correlation matrix of a time-domain steering-vector signal of length N.M. Rather, R is the block-diagonal matrix obtained from the individual noise correlation matrices as follows:

$$R=\begin{bmatrix} R_1 & 0 & \cdots & 0 \\ 0 & R_2 & & \cdots \\ \cdots & & \cdots & 0 \\ 0 & \cdots & 0 & R_N \end{bmatrix}$$

(note that for the purpose of understanding the present invention one can assume that all individual noise correlation matrices are equal, representing the second-order statistics of the interference-plus-noise environment of the array).

Therefore R can be represented as the summation of N noise correlation matrices corresponding to parallel steering vectors of size N.M:

$$R=\sum_{i=1}^{N} E[X_i\cdot X_i^H]$$

where the N.M-dimensional parallel steering vectors $X_i$, $1 \leqq i \leqq N$, are obtained from the array steering vector X by distributing X onto each individual channel of the "parallel beamformer" (corresponding to each look direction), as follows:

$$X_i=\begin{bmatrix} 0 \\ \cdots \\ 0 \\ [X] \\ 0 \\ \cdots \\ 0 \end{bmatrix}\begin{matrix} \}\text{length } (i-1)\cdot M \\ \}\text{length } M \\ \\ \end{matrix}\ \Bigg\}\text{length } N\cdot M.$$

Figure 2:
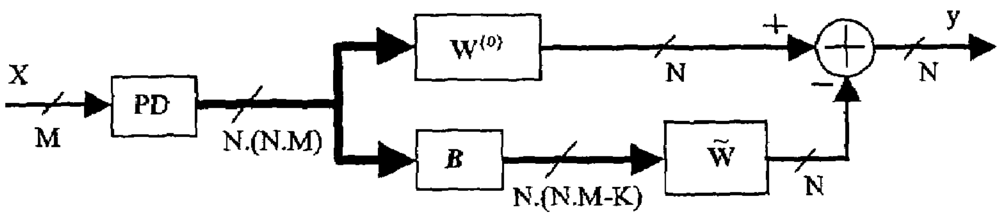
FIG. 2 is a block diagram of a parallel GCS structure according to the present invention.

The "parallel adaptive beamformer" set forth above may be represented by the parallel GSC structure shown in FIG. 2. The Parallel Distribution block (PD) implements the distribution operation from the array steering vector X to the set of parallel beamformer steering vectors $X_i$, $1 \leqq i \leqq N$.

The adaptive process takes place with a set of N reference signals and corresponding error signals (one pair reference-error for each channel of the parallel beamformer, that is, each look direction) driving the adaptation of a single parallel weights vector $\tilde{W}$. Letting $U_i$, $1 \leqq i \leqq N$, and $y_i$, $1 \leqq i \leqq N$ denote the time-domain, real-valued reference signals and error signals corresponding to each distributed channel of parallel beamforming; then the reference and error signals needed for the adaptive process are calculated as $U_i=X_i^T.B$ (length N.M−K) and $y_i=X_i^T.W^{(O)}$ (scalar).

The cost function for the adaptive optimization process, which is the summation of the cost functions for all channels of the parallel beamformer, can be expressed as:

$$e=\sum_{i=1}^{N}\left(y_i-U_i^T\tilde{W}\right)^2.$$

A better appreciation of the superiority of the parallel GSC structure over the prior-art method discussed above will be obtained by considering the beamformer design problem under response equalization constraints. The number of degrees of freedom in the optimization process (that is, the size of the unconstrained beamformer-weights array $\tilde{W}$) is equal to N.M−(2.N−1)=N.(M−2)+1 with the parallel GSC structure as opposed to N.(M−2) with the prior-art method. As in the fixed-beamforming framework, this extra degree of freedom accounts for a better solution of the optimization problem and therefore better performance (more interference cancellation and less white-noise gain) of the resulting adaptive beamformer.

As in the fixed-beamforming case, the equalization constraints in the parallel GSC structure of FIG. 2 are optimal in the sense that they force the response of all beamformers to have the same response to the equalization signal without actually specifying the response value. The resulting response value can therefore fluctuate with time and stay optimal with respect to the statistics of the steering vector signal.

A person of ordinary skill in the art may conceive of other embodiments and variations of the invention. For example, such a person will understand that the known variants to the conventional GSC structure (see [3]) can be extended to the parallel GSC structure of the present invention. Such a skilled person will also understand that whereas the embodiment of the invention set forth herein applies to the narrowband case wherein weights are scalars for each channel, it is a straightforward matter to extend the parallel GSC structure to broadband-beamforming where the adaptive process is performed on filters and the resulting beamformers present the desired characteristics over a pre-determined frequency range. In terms of applications and uses of the invention, the embodiment set forth herein has been described in terms of hands-free telephony where the equalization signal is the loudspeaker coupling signal (see [2]). However, similar response-equalization problems may arise in other applications and the present invention generally applies to any application where such a response-equalization problem needs to be solved in the context of adaptive beamforming. Since numerous modifications and changes will readily occur to those skilled in the art, it is not desired to limit the invention to the exact construction and operation illustrated and described, and accordingly all suitable modifications and equivalents may be resorted to, falling within the scope of the invention as defined by the claims appended hereto.

What is claimed is:

1. In an adaptive beamformer for receiving an array steering vector X from M sensors, and applying said array steering vector to N individual beamformers for generating respective beams in respective look directions, said beamformer being characterized by a constrained optimization condition expressed as $$\operatorname*{Min}_{W}(W^H.R.W)$$

subject to $C^H.W=G$ where W=W(v) is a concatenated array of size N.M of all beamformer weight vectors W(v), $W^H$ denotes the Hermitian transpose of W, R=R(v) is a block-diagonal concatenated noise correlation matrix, C=C(v) is a concatenated constraint matrix of size N.M×K where K is the number of constraints, and G=G(v) is a concatenated constraint gain vector of size K, the improvement comprising:

a parallel blocking matrix B of size N.M×(N.M−K) for transforming said constrained optimization condition to an unconstrained parallel optimization problem condition expressed as $$\operatorname*{Min}_{\tilde{W}}\left((W^{(0)}-B.\tilde{W})^H.R.(W^{(0)}-B.\tilde{W})\right),\quad \text{where } W^{(0)}=\begin{bmatrix} W_1^{(0)} \\ \dots \\ W_N^{(0)} \end{bmatrix}$$

is a concatenated fixed-beamformer array of size N.M and $\tilde{W}$ is a parallel unconstrained beamformer-weights array of size (N.M−K); and a parallel distribution block for mapping said array steering vector X to a set of parallel steering vectors $X_i$, $1 \leqq i \leqq N$ corresponding to respective look directions of said N individual beamformers according to $$X_i=\begin{bmatrix} 0 \\ \dots \\ 0 \\ [X] \\ 0 \\ \dots \\ 0 \end{bmatrix} \begin{matrix} \left.\vphantom{\begin{matrix}0\\ \dots\\ 0\end{matrix}}\right\}\text{length } (i-1)\cdot M \\ \}\text{length } M \\ \\ \\ \\ \end{matrix} \left.\vphantom{\begin{matrix}0\\ \dots\\ 0\\ 0\\ 0\\ \dots\\ 0\end{matrix}}\right\}\text{length } N\cdot M,$$

such that said concatenated noise correlation matrix R may be expressed as the summation of N noise correlation matrices corresponding to steering vectors of size N.M:

$$R=\sum_{i=1}^{N} E[X_i\cdot X_i^H].$$

2. The improvement of claim 1 further comprising updating the parallel unconstrained beamformer-weights array $\tilde{W}$ using N pairs of reference-error signals comprised of $U_i=X_i^T.B$ (length N.M−K) and $y_i=X_i^T.W^{(0)}$ (scalar) to produce an error signal obtained by summation of individual error signals $$e=\sum_{i=1}^{N}\left(y_i-U_i^T\tilde{W}\right)^2.$$

3. The improvement of claim 1, wherein said sensors are microphones in an audio conferencing unit.

4. The improvement of claim 1, wherein said sensors are radar sensors.

5. The improvement of claim 1, wherein said sensors are sonar sensors.

6. The improvement of claim 3, wherein said constrained optimization condition is loudspeaker coupling equalization.

7. In an adaptive beamformer for receiving an array steering vector from a plurality of sensors, and applying said array steering vector to a plurality of N individual beamformers for generating respective beams in respective look directions, a method of simultaneously adaptively updating said N parallel beamformers under a constrained optimization condition, comprising:

transforming said constrained optimization condition to an unconstrained parallel optimization problem expressed as a function of a parallel unconstrained beamformer-weights array;

mapping said array steering vector to a set of parallel steering vectors by distributing said array steering vector onto individual channels of said N parallel beamformers; and updating the parallel unconstrained beamformer-weights array using N pairs of reference-error signals.

* * * * *